Figure 4:
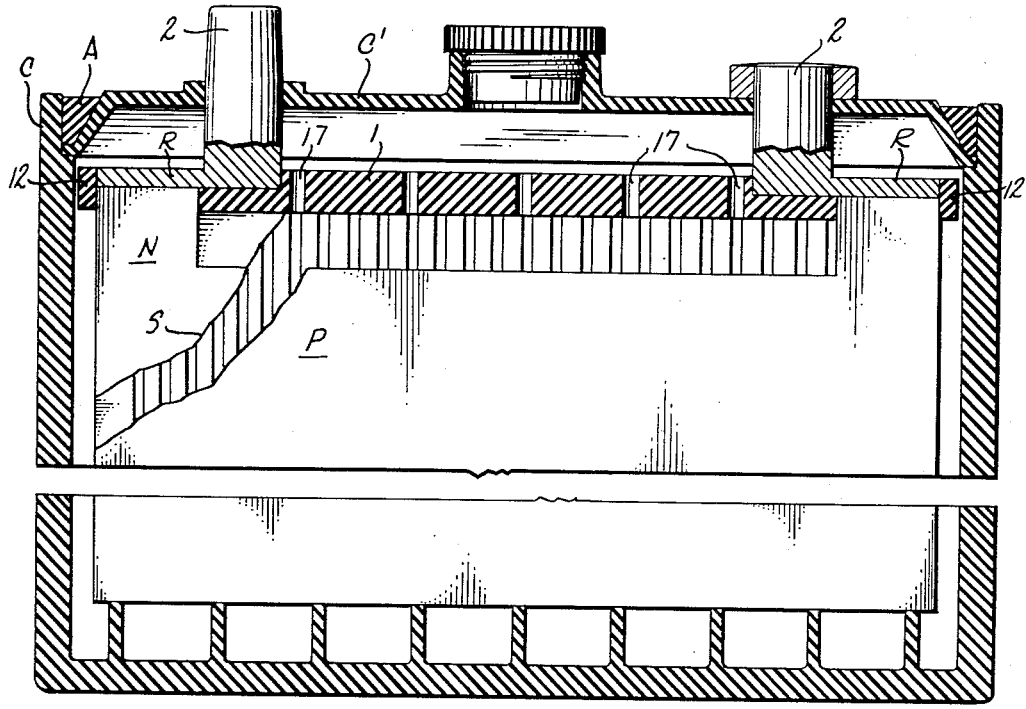

Feb. 22, 1955 M. F. CHAPEL 2,702,829
STORAGE BATTERY CELL PLATE INTEGRATOR
Filed Sept. 10, 1951 4 Sheets-Sheet 1
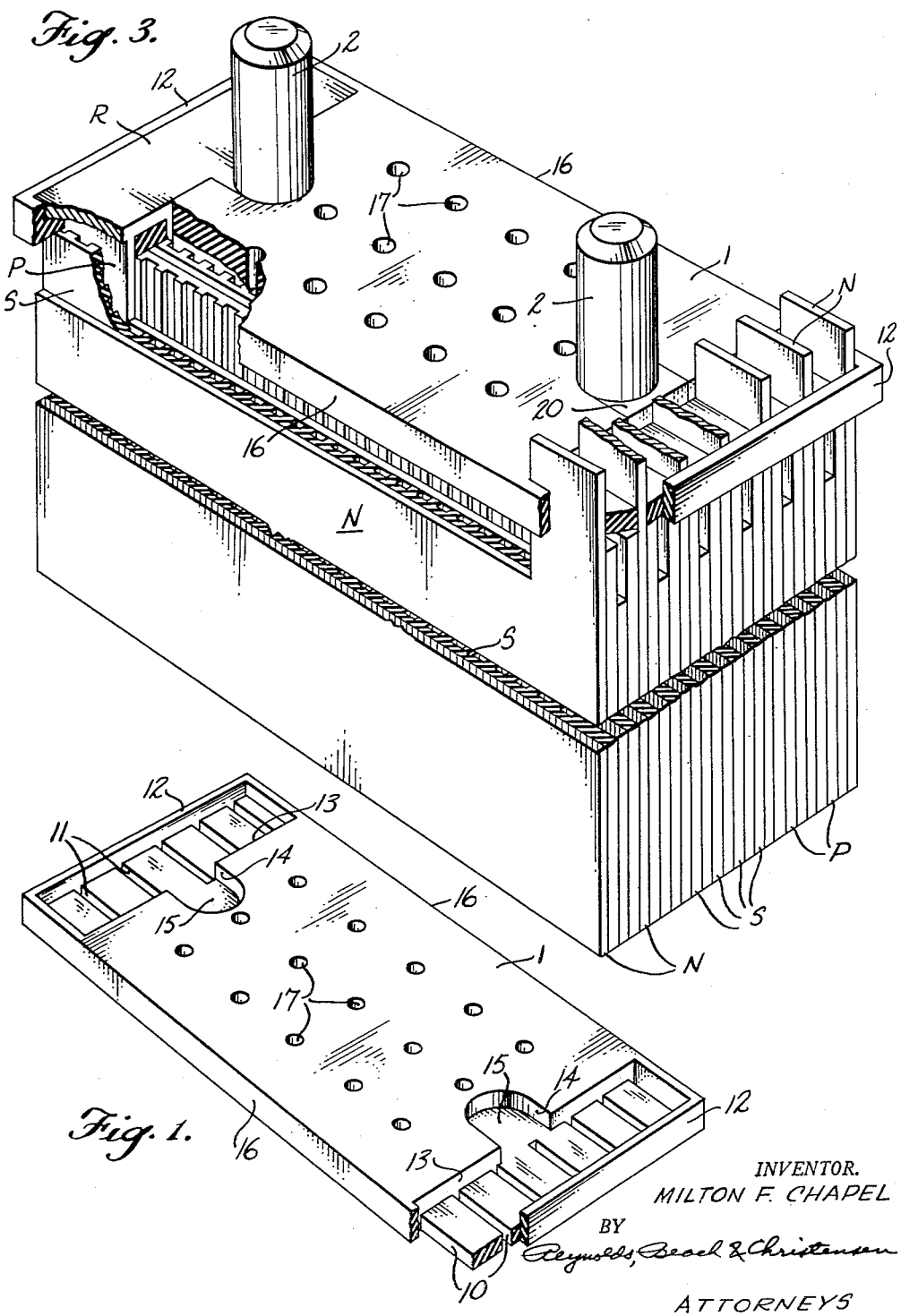
INVENTOR.
MILTON F. CHAPEL
BY
ATTORNEYS Feb. 22, 1955

M. F. CHAPEL 2,702,829

STORAGE BATTERY CELL PLATE INTEGRATOR

Filed Sept. 10, 1951

4 Sheets-Sheet 2

INVENTOR.
MILTON F. CHAPEL
BY
Reynolds, Beach & Christensen
ATTORNEYS

Feb. 22, 1955 M. F. CHAPEL 2,702,829
STORAGE BATTERY CELL PLATE INTEGRATOR
Filed Sept. 10, 1951 4 Sheets-Sheet 3
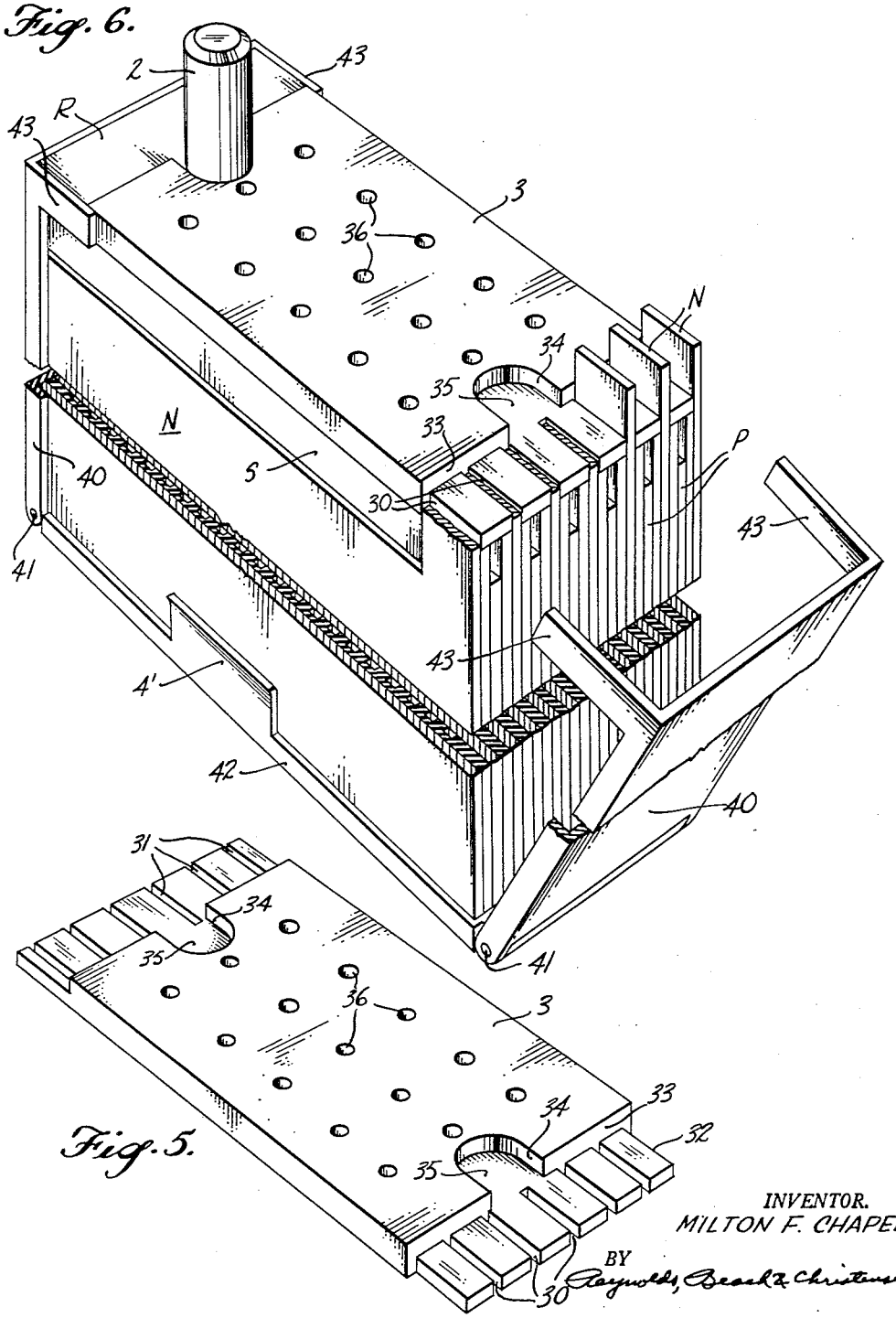
INVENTOR.
MILTON F. CHAPEL
BY
ATTORNEYS

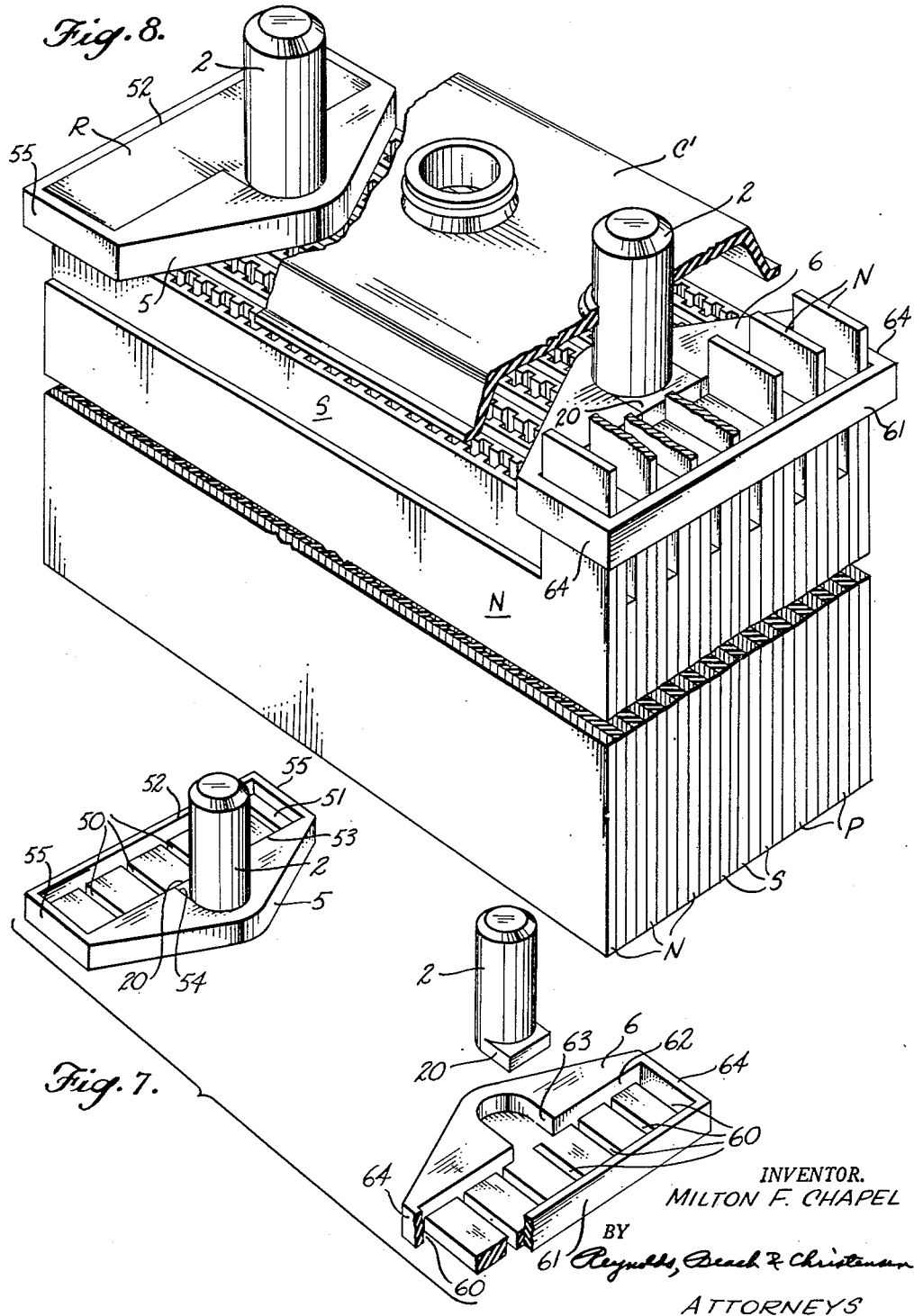

United States Patent Office 2,702,829
Patented Feb. 22, 1955

2,702,829

STORAGE BATTERY CELL PLATE INTEGRATOR

Milton F. Chapel, Oswego, Oreg.

Application September 10, 1951, Serial No. 245,851

6 Claims. (Cl. 136—80)

This invention relates to storage battery construction and the method of making storage batteries, and is concerned particularly with a top plate of insulating material to integrate the group of plates in a storage battery cell.

Perhaps the most important object of the invention is to facilitate the assembly of the metal plates and intervening separators, usually of wood, of which the cell is composed, and specifically this object is accomplished by assembling the plates and separators alternately in their proper order into a stack before the plates are joined together, so that it is not necessary to form first a group of interconnected positive plates, separately form a group of interconnected negative plates, assemble these groups, and then insert separators between the plates of the two groups.

In the process of assembling the cell units, therefore, it is an object to reduce to a minimum the equipment required for the cell assembly, and correspondingly to decrease the investment in equipment by enabling the process to be performed with simple cell assembly holders.

A further object is to provide a cell structure in which the plates of the two cell groups are held together more securely to avoid the possibility of a plate being severed from its group, and which in addition preferably will interconnect the plates of the positive and negative plate groups so that they will be held firmly in their proper relationship to enable them to be handled easily during assembly of the cells into a battery case which will reduce damage, and hence the number of cells or batteries rejected because of damage to complete cell assemblies.

Another object is to promote economy in the manufacture of storage battery cell units by enabling the interconnection of the plate tabs to be expedited, while at the same time saving lead and gas used in the lead burning process, so that the cost of producing storage batteries in intermittent batches approaches the cost of continuous line production battery cost.

The proper assembly of the cell groups or units into the battery case will also be expedited because the new cell structure may include a case engaging portion which will engage the case and space the plates of the cell group from the wall of the cell cavity, and when thus assembled in the case the cell units will be held against movement relative to the case when the battery is vibrated or shaken.

Not only will the cell be held against movement relative to the case, but the separators will be held down in proper position and sloshing of the electrolyte will be damped so as to prevent erosion from washing of the electrolyte over the surface of the plates, and in addition erosion from gas bubbles moving upward across the plates when the battery is overcharged will be minimized because of the damping action afforded by the present cell construction.

Another object of this battery cell structure is to protect the upper edges of the separators against damage by probing through the hole in the cover plate, such as in testing the cell with a hydrometer, and the cell plates also will be protected against shorting by foreign matter dropped into the cell cavity through the cover opening. At the same time it will be easier to determine whether the cell contains an adequate, but not excessive, quantity of electrolyte.

The present cell construction also improves the uniformity of temperature of the electrolyte throughout the cell because it provides a baffle deterring thermal circulation of the electrolyte within the cell compartment.

To accomplish these various objects the cell structure includes a top plate of insulating material having in it a series of parallel slots receiving the tabs of a group of battery plates. Preferably the top plate substantially covers the top of the cell and has two series of parallel slots, one near each end, to receive respectively the tabs of the positive plate group and the tabs of the negative plate group. This top plate will rest upon the separators so that they are held down, and the straps interconnecting the tabs of the plate groups will overlie the top plate, securing it in place as an integral part of the battery cell assembly. Preferably the slotted portion or portions of the top plate are depressed below the general level of its upper surface and adjacent to the slotted portion. Recesses in the upper surface of the plate may be provided to receive the lower ends of the battery posts. The depressed slotted area of the top plate may be encircled completely by a shoulder to form a cavity constituting a mold for the strap interconnecting the tabs of the plates. In addition, the margin of the top plate may extend sufficiently beyond the stack of plates and separators as to constitute a spacer engaging the walls of a battery case cavity to locate the cell assembly centrally of the cavity and to hold it in that position against vibration or impact resulting from movement of the battery case.

Additional features and advantages of the integrated storage battery cell structure, in which the integrator is incorporated, and the method of making storage batteries using such integrator, will be discussed in the following detailed description of the several representative forms of the invention illustrated in the accompanying drawings.

Figure 2:
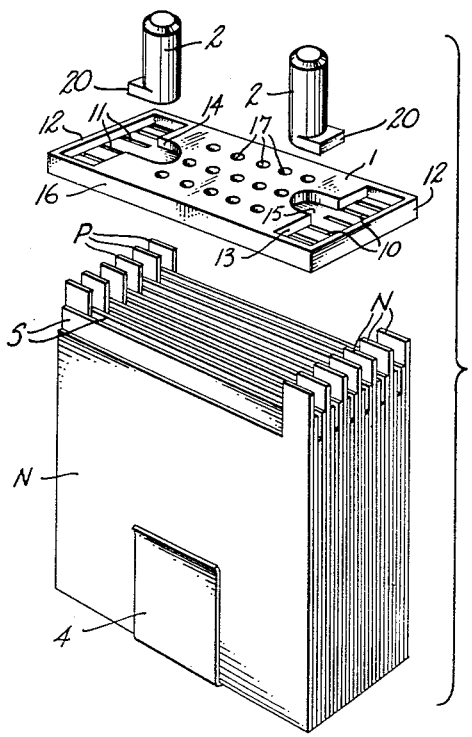

Figure 1 is a top perspective view of an insulating top plate utilized in the present invention, and Figure 2 is an exploded top perspective view of a storage battery cell assembly, including the separator and plate stack, the insulating top plate, and the cell posts to be assembled into a unit. Figure 3 is a top perspective view of a storage battery cell assembly incorporating the top plate of Figure 1 with parts broken away to show internal structure. Figure 4 is a transverse sectional view through a storage battery with the cell assembly of Figure 3 installed in the case, with parts broken away.

Figure 5 is a top perspective view of a different form of insulating top plate, and Figure 6 is a top perspective view of a storage battery cell assembly partially fabricated, and with parts broken away, incorporating the top plate of Figure 5.

Figure 7 is a top perspective view of still another type of top plate arrangement including separate top plate elements for opposite ends of a cell assembly, the farther top plate having a battery post mounted in it, and the nearer top plate having a battery post shown in exploded relationship to it and having parts broken away to reveal structural details. Figure 8 is a top perspective view of a cell assembly, partially fabricated, and showing the relationship of a cell cover to the cell assembly, parts being broken away to disclose structural details.

In order to appreciate the advantages of the present invention more readily, a brief review of conventional storage battery manufacturing technique may be helpful. Usually a lead grid having a tab projecting from its upper edge at or near one corner has its interstices filled with a lead compound paste of electrode material. Such plates are then assembled one by one by insertion of their tabs into a burning comb which is a bar having slots open at one end to receive the plate tabs. This comb spaces the plate tabs apart, and then by a lead burning operation the portions of the battery plate tabs projecting above the comb are melted down to form a plate tab interconnecting strap, and a post is welded to such strap, such additional lead as necessary being added to complete the strap and post connection.

Unless care is exercised all the plate tabs may not be precisely aligned prior to such burning operation. Also, unless the tabs fit very tightly in the comb, lead may run down the edges of the plate tabs and form beads beneath the comb, and this possibility is increased because such burning combs usually are of metal, and especially after repeated use become heated rather highly so that the comb tends to heat the portions of the tabs passing through it and to maintain the fluidity of the melted lead above the comb and which may enter a comb slot. Such heating effect further retards the cooling and setting of the lead forming the strap. After completion of the strap formation and post joining operation the entire plate group is moved edgewise to withdraw the plate tabs from the open ends of the comb slots.

When the proper number of positive plates for a storage battery cell has been assembled and thus joined into a group and a similar group of negative plates, usually having one more plate than in the group of positive plates, has been assembled, the two plate groups are placed together with their plates interleaved in alternate arrangement. Between adjacent plates are then inserted insulating separators usually of thin wood grooved along one side at least, such grooved side being placed next to the positive plates. These separators are ordinarily pushed into place by edgewise movement, and the tabs of the battery plates are sufficiently flexible that the first few separators may be inserted readily. As the last few separators are inserted, however, progressively less space is afforded for the plates to yield and consequently these separators scrape along the surface of the battery plates, which may mutilate the plate surface somewhat, and may split or otherwise injure the separators. In any event considerable care must be exercised in such operation to avoid injury to the battery plates or separators, which requires considerable time. After the plates and separators have been assembled in this manner, the cell assembly is inserted into one compartment of a storage battery case. The two groups of plates are entirely unconnected during this handling and assembly operation, only the friction between the plates and separators being relied upon to maintain the plates in proper relationship. Moreover, during the assembly of the plate groups and separators frequently no locating means are employed to establish the relationship of the plate groups accurately. Any displacement of the plate groups may be discovered only after the cell unit has actually been installed in the case, and an attempt is made to apply a cell cover to the case cavity. If the plate groups have not been located properly relative to each other, or if they have become displaced relatively during handling or installation in the battery case, or if holding shims are applied improperly to hold the cell assembly in the battery case compartment, the cover may not fit accurately on the cell assembly.

By using the storage battery cell structure of the present invention the various disadvantages discussed above in the conventional battery manufacturing practice are eliminated.

Considering first the battery and cell construction shown in Figures 1 to 4, inclusive, Figure 2 illustrates a typical assembly technique for the cell structure incorporating a top plate 1, such as shown in Figure 1. Instead of constructing independently a group of interconnected positive plates and a separate group of interconnected negative plates as in the usual storage battery manufacturing process, the first step in the present process is to assemble a stack of interleaved positive and negative plates with separators between them. In preparing such a stack, for example, the plates and separators may be assembled conveniently with these elements in horizontal planes by laying first a negative plate, then a separator with its ribbed surface upward, then a positive plate with its tab projecting in the same direction as that of the negative plate but disposed toward an opposite edge of the stack, then a separator with its ribbed surface downward, then another negative plate, a further separator with its ribbed surface upward, a positive plate, a separator with its ribbed surface downward, a negative plate, etc., until the stack is completed by a negative plate when the desired number of plates has been stacked. As shown in Figure 2, the cell may be of the thirteen-plate type, including six positive plates and seven negative plates.

When the plates and separators have thus been stacked in the desired arrangement, the stack may be turned to rest on the bottom edges of these elements, and held in this position by any suitable device such as the U-shaped spring metal clamp 4, having ends extending upward a reasonable distance along the sides of the stack. Before being thus supported the plates and separators, while held loosely, should be shifted relatively as may be necessary to align their bottom edges and their opposite vertical edges respectively in coplanar relationship. When thus held by the clamp 4, therefore, all the tabs of the negative plates N should be in parallel registry, and all the tabs of the positive plates P should be in parallel registry.

The top plate 1, shown in Figures 1 and 2, has in one end a series of parallel slots 10, each of a width only slightly greater than the thickness of a plate tab, and each of a length only slightly greater than the width of a plate tab. Moreover, these slots 10 are spaced apart a distance from center to center substantially equal to the thickness of two battery plates and two separators, and the end slots 10 are disposed adjacent to the opposite sides of the top plate 1. At the other end of the top plate slots 11 are formed in it, which again are parallel, and are of a width substantially equal to the thickness of a battery plate tab, and of a length approximately equal to the width of a battery plate tab. Moreover, these slots also are spaced apart a distance equal to the thickness of two plates and two separators. The spacing between the group of slots 10 and the group of slots 11 will be equal to the proper spacing between the tabs of the positive plates P and of the negative plates N. Also, the end slots 11 will be spaced somewhat from the respective sides of the top plate or cell plate integrator 1.

It will be evident that with the tabs of the storage battery plates N and P held in the proper assembled relationship shown in Figure 2, it should be possible to lower the top plate 1 onto the upper edges of the separators S by passing the tabs of all the negative plates N through the slots 10, respectively, and the tabs of all the positive plates P through the slots 11, respectively. The integrator would then assume the position shown in Figure 3, and the tabs of the storage battery plates would project a substantial distance above the upper surface of the top plate, as shown at the near side of Figure 3. The battery posts 2, shown in Figure 2, can then be disposed alongside the groups of negative plate tabs and positive plate tabs, respectively, ready for the lead burning operation, to unite the tabs in the two groups by a molded strap and to weld this strap to the projection 20 at the bottom of each battery post.

The top plate or cell plate integrator 1 may be made of any suitable, preferably stiff, insulating material, such as rubber, plastic, glass, ceramic, non-metallic mineral such as asbestos, or vegetable material such as pressed or cut woody material. Moreover, these plates may be either cut or molded into the desired shape, as may be preferred.

The top plate may have an upper surface planar over its entire extent, in which event some provision must be made for a form to contain the molten lead in forming the strap to interconnect the tabs of the plates in each group. Such a form might simply be set on top of the top plate, or might be supported separately from the top plate, but in order to minimize leaks between the upper surface of the top plate and its slotted surface, it is preferred that a rim 12 integral with the rest of the plate 1 be formed around each slotted portion of the plate. Adjacent to the center of the plate this rim is in the form of the shoulder 13 extending perpendicular to the grooves, and this shoulder includes a generally central portion 14 deflected away from the slots and defining a recess 15 of a shape to receive the lower end of a post 2, and preferably with its projection 20 substantially in continuation of the shoulder 13. When the portions of the tabs projecting above the slotted portion of the plate 1 at each end are melted down, the metal produced by such tabs should substantially fill the depression within the rim 12 and shoulder 13, which rim will be made of a height substantially equal to the desired thickness of the strap. If the length of the battery plate tabs are thus designed, it will not be necessary to add much if any lead in the burning operation to form the battery plate connecting strap, which reduces the work and time involved in this operation.

Since the plate 1 will be secured to the battery cell assembly as an integral part of it by the strap forming operation, it is only used once, and because it is not reheated and in addition is of electrically insulating material and preferably of heat insulating material, the plate will not be heated appreciably, and consequently the molten lead will tend to set rapidly. Ample time may, however, be provided for setting of the metal because it is not necessary to remove a plate group from the plate 1 in order to insert another set of plates. In the procedure for assembling the cell elements into a unit, therefore, it is merely necessary to install the top plate 1 on the package of plates and separators, place the posts on the top plate, and perform the lead burning operation to complete the assembly. It is not necessary to remove the joined plates from a comb after cooling, and thereafter to assemble the positive and negative plates and the separators as was done previously.

Moreover, it will be evident that the resultant cell structure is far more rugged than prior such structures. The top plate not only positively locates all the tabs from one plate group relative to each other, but also locates the tabs of one plate group relative to the tabs of the other plate group, so that after the lead burning operation the posts are definitely located and cannot be shifted either lengthwise of the plate 1 or transversely of it. The plate tabs themselves are located not only by an end joint, but by the side supporting effect of the slots through which they pass in the top plate 1. Consequently, the cell structure can be handled quite roughly without dislocation of its elements.

When the cell structure is installed in the cell cavity of a battery case C, as shown in Figure 4, the top plate 1 will further insure that the plate and separator assembly is spaced properly and uniformly from the walls of the case cavity if the rim 12 at each end of the plate 1 projects beyond the edges of the plates and separators, and the sides 16 of the plate project slightly beyond the respective side faces of the plate and separator stack. The amount of spacing between the plate and separator stack and the wall of the casing cavity may, of course, be made as much or as little as desired by varying the thickness of the plate and separator stack, or the width of the casing cavity, but in any event the margins of the top plate 1 preferably lie close alongside the wall of the cavity. The cell assembly will be prevented from vibration within the cavity by engagement of the top plate with the cavity walls without relying solely on the locating action of the cell posts in the cell cover. It is not necessary, of course, that the side edges of the top plate 1 be straight to obtain this effect, for even projections spaced around the margin of this plate would accomplish the same purpose.

While the shape of that portion of plate 1 between the groups of slots may vary considerably, it is preferred that this plate portion be substantially the full width of the plate and separator assembly and have in it apertures 17. These apertures should be of adequate size to enable liquid added to a cell cavity to flow readily into the space below it, but should be small enough to prevent the tip of a hydrometer passing through one of such holes to prod the edges of the separators beneath the plate. Such plate will serve as a gauge for the amount of electrolyte in the battery cell, because the liquid should be kept a reasonable distance above the tops of the separators, and if the liquid level is sufficiently above the top plate to enable a hydrometer test of the cell to be made, adequate liquid will be in the cell. In addition, such a perforated plate protects the battery plates from foreign articles which might be dropped throguh the filler hole in the cell cover, and will serve as a baffle to deter appreciable sloshing of the electrolyte within the cell cavity and the consequent erosion of the battery plates. Such a top plate serves the further function of retarding convection within the electrolyte and emission of gas when a battery is overcharged, thus tending further to prevent erosion of the plate surface and keeping the temperature of the electrolyte more nearly constant. Despite such upward movement of gas bubbles and dislodging tendency which may result from slight vibration and sloshing of the electrolyte, it will be evident that the top plate will always hold the separators down firmly.

After the cell assembly of plates, separators, top plate and posts has been assembled in the cavity of a battery case, the cover C' will be installed on the posts 2 in the usual way and will be sealed by asphaltic composition around its edges. The proper spacing of posts 2 will, of course, be insured by the top plate 1 post receiving cavities 15, and these posts will be located properly with respect to the walls of the battery case cavity by the top plate, so that the covers can be installed exceptionally quickly.

Where a top plate 1, such as shown in Figure 1 and described above, is used, a minimum of equipment is required to fabricate the battery cell assembly. No form equipment is required for shaping the cell plate interconnecting straps R. The principal function of the slotted top plate, however, is to enable the plates and separators to be assembled as a stack, located properly, and the plate ends joined by their interconnecting straps without the necessity of forming a group of interconnected positive plates and a group of interconnected negative plates separately, and then assembling them and inserting the separators between the plates. Consequently, it is not essential that the top plate form all or even part of the mold cavity for the plate tab interconnecting strap.

In the top plate 3 shown in Figure 5 open-ended groups of parallel slots 30 and 31 are formed in its opposite ends, respectively. In this instance the width of the top plate is just equal to the thickness of the stack of battery plates and separators. This type of top plate would be employed where the stack of plates fits quite closely, both sidewise and endwise, in the cavity of a battery case.

Since a negative plate customarily is on each outer side of a plate and separator assembly, a recess 32 of a width equal to the thickness of a battery plate is divided at each end of the group of slots 30 to accommodate the tabs of the negative battery plates. Corresponding recesses are not necessary at the opposite end of plate 3, however, because as in the form of top plate previously described the slots 31 and slots 30 will be in staggered relationship.

Also, as mentioned in connection with the top plate shown in Figure 1, the top plate 3 of Figure 5 could have its entire surface disposed coplanar with its slotted portions, but it is preferred that a shoulder 33 be provided perpendicular to the slots of each group and along the closed ends of such slots to serve as one side of a strap forming cavity. The central portion of this shoulder 34 is deflected away from the slots to form a cavity 35 adjacent to each group of slots to receive the lower end of a post 2 and its projection 20 with the edge of such projection preferably flush with the shoulder 33 comparable to the recesses 15 of the top plate shown in Figure 1.

With a top plate like the plate 3 shown in Figure 5, it is desirable to use a somewhat more elaborate form of plate stack holding device. Instead of relying entirely on a channel-shaped clamp 4' to hold the stack in tightly assembled condition, end clamping members 40, at least one of which is connected by a pivot 41 to a base plate 42, are provided. Each of these end clamping members includes arms 43 mounted at opposite sides of the upright end of the plate 40 and projecting transversely from it toward the battery plate and separator stack and the other end plate. These arms are spaced apart a distance just equal to the width of the plate and separator stack and the width of the plate 3.

When the plates 40 are swung upward about their pivots, therefore, they will embrace the opposite side edges of the top plate 3 at its opposite ends, as shown in the remote portion of Figure 6, while the slots of the top plate itself will hold the battery plate tabs in the proper spaced relationship transversely of such plates. When thus positioned the fit of the upper ends of plates 40 and arms 43 will be such as to effect a leak-proof joint between such clamping end plates and the ends of top plate 3. Also, plates 40 will be of sufficient length and arms 43 will be of sufficient width, so that with the shoulders 33 they will form recesses over the slotted portions of plate 3 deep enough to serve as a mold for a battery plate tab interconnecting strap of adequate thickness.

To fabricate a cell structure using a top plate 3 as shown in Figure 5, therefore, the stack of positive and negative plates and separators is assembled, as explained previously. The lower edge of this stack is then slipped into the U-shaped holding clamp 4', the top plate 3 is lowered onto the stack so that the tabs extend upwardly through the slots 30 and 31, and the end plates 40 are swung upward into clamping position at opposite ends of the top plate 3. If one of these end plates is fixed the plate and separator stack will be pushed edgewise between the arms 43 and then the other end plate swung up to obtain the same effect. The posts 2 are then placed in their cavities 35, and the lead burning operation is performed to form the straps R. As soon as this metal has solidified the end plate or plates 40 are swung downward and the completed cell assembly is removed from the holding device.

The top plate 3 has in it holes 36 comparable to the holes 17 in plate 1, and which serve the same function. Consequently, it is not necessary to discuss further the function of this top plate or the installation of the completed cell in the battery case. It may be pointed out, however, that because the top plate of Figure 3 would be used in a type of plate assembly where the plates fitted snugly within the battery cell cavity, it is not necessary to rely on the edge-engagement of the top plate 3 with the wall of the cavity to hold the battery plate and separator stack in proper position within the battery case. The edges of this plate, therefore, will be proportioned to fit accurately in the clamping device used during cell fabrication as discussed above rather than the battery case cavity.

In the further alternate battery cell construction shown in Figures 7 and 8 the top plate is made in two separate parts 5 and 6, the former including a slotted portion having in it slots 50, and the latter having in it slot 60 to receive the tabs of the positive and negative plates, respectively, of a storage battery cell. If it were not for the necessity of the slots 50 and 60 being in staggered relationship, the two top plate elements 5 and 6 might be duplicates. Since such staggered relationship of the parts is necessary, however, the top plate member 5 will have a ledge 51 adjacent to each of its end slots, whereas the top plate member 6 will have a slot 60 immediately adjacent to a rim 61 cooperating with a shoulder 62, encircling the slotted portion of this top plate element to form a strap molding cavity, as described in connection with the top plate shown in Figure 1. Similarly, the top plate member 5 has a marginal portion adjacent to the ledges 51 and a rim 52 along one end of the group of slots 50 cooperating with a ledge 53 to form a strap molding cavity for the positive plate tabs.

Just as in the top plates 1 of Figure 1 and 3 of Figure 5 the shoulders 52 of the top plate element 5 and 62 of the top plate element 6 have deflected portions 54 and 63, respectively, to form cavities for receiving the lower ends of posts 2 and their projections 20. While these top plate elements will not establish the spacing of the negative plate tabs relative to the positive plate tabs, such elements will, when assembled on a stack of battery plates and separators, as shown in Figure 8, hold the tabs of the two groups in proper relationship within such groups and will constitute a mold for formation of the plate tab interconnecting strap R in each instance. Because these top plate elements are left in place each group of plates will be strengthened, and there will be no more tendency for separation of one group of plates from the other than in the usual battery cell construction. When the cover plate C' has been installed on the assembly, of course, the posts 2 will be secured in proper spaced relationship.

When the cell assembly has been installed in the cavity of a battery case, it will be evident that the marginal portions 52 and 61 at the ends of the respective groups of slots 50 and 60 will serve to space the edge of the plate end separator stack from the wall of the case cavity, and the side portions 55 and 64 of the top plate elements 5 and 6 will maintain the proper spacing between the side faces of the stack and the sides of the cavity, just like the top plate element 1 of Figure 1. The top plate elements 5 and 6 do not have all the advantages of the top plate element 1, because, for example, the separators between the battery posts would be left unprotected and no baffle effect in the central portion of the cell would be produced to deter sloshing of the electrolyte. The two top plate elements 5 and 6 together require only about half as much material as the top plate elements of Figures 1 and 5, however, so that for reasons of economy use of these separate top plate elements may be justified. This form of top plate structure will afford almost as much economy in manufacture as the other type of top plates described.

I claim as my invention:

1. A storage battery cell unit comprising a plurality of positive electrode plates and a plurality of negative electrode plates in interleaved relationship, said positive electrode plates having tabs extending upwardly therefrom and said negative electrode plates having tabs extending upwardly therefrom and spaced edgewise from the tabs of said positive electrode plates, a plurality of insulating separators disposed between adjacent plates, an electrode plate integrator including a plate of insulating material overlying the upper edges of said positive and negative electrode plates and of said separators, and having a depressed portion with a group of spaced parallel slots formed therein receiving respectively the tabs of electrode plates and a raised portion, a metal strap overlying said depressed portion of said integrator, disposed alongside said raised portion and interconnecting the tabs of said plates received in said slots, and a cell cover overlying said integrator plate with the major portion of said cover being spaced a substantial distance above said integrator plate.

2. A storage battery cell unit comprising a plurality of positive electrode plates and a plurality of negative electrode plates in interleaved relationship, said positive electrode plates having tabs extending upwardly therefrom and said negative electrode plates having tabs extending upwardly therefrom and spaced edgewise from the tabs of said positive electrode plates, a plurality of insulating separators disposed between adjacent plates, an electrode plate integrator including a plate of insulating material overlying the upper edges of said positive and negative electrode plates and of said separators, and having at opposite ends thereof depressed portions and an intervening raised portion, each depressed portion having a group of spaced parallel slots therein, the slots of the slot group in one depressed portion receiving respectively the tabs of said positive electrode plates, and the slots of the slot group in the other depressed portion being staggered with respect to the slots in the first depressed portion and receiving respectively the tabs of said negative electrode plates, a metal strap overlying each depressed portion of said integrator plate, disposed alongside said raised portion and interconnecting the tabs of all the plates received in said slots of the respective depressed portion, and a cell cover overlying and covering said integrator plate with the major portion of said cover being spaced a substantial distance above said integrator plate.

3. The storage battery cell unit defined in claim 2, the electrode plate integrator having a storage battery post receiving recess in each depressed portion thereof, and a storage battery post received in each such post receiving recess joined to the strap in the respective depressed portion and extending upward through the cover plate.

4. A storage battery cell unit comprising a plurality of positive electrode plates and a plurality of negative electrode plates in interleaved relationship, said positive electrode plates having tabs extending upwardly therefrom and said negative electrode plates having tabs extending upwardly therefrom and spaced edgewise from the tabs of said positive electrode plates, a strap interconnecting all the tabs of said positive plates, a strap interconnecting all the tabs of said negative plates, a plate of insulating material overlying the upper edges of said positive and negative electrode plates and of said separators including a perforated portion disposed between said straps constituting a splash baffle, a cell cover overlying said integrator plate with the major portion of said cover being spaced a substantial distance above said integrator plate, and a battery post connected to each of said straps and overlying said insulating material plate and extending upward through said cover plate.

5. A storage battery comprising a case, a cell unit received in said case including a plurality of positive electrode plates and a plurality of negative electrode plates in interleaved relationship, a plurality of insulating separators disposed between adjacent electrode plates, a positive post connected to said positive electrode plates, a negative post connected to said negative electrode plates, a plate of insulating material disposed beneath said posts, overlying the upper edges of said positive and negative electrode plates and disposed close to the upper edges of said separators and having edge portions extending oppositely beyond the outermost electrode plates substantially into engagement with opposite walls of the storage battery case, and a cover fitting the top of said case and overlying said insulating material plate with the major portion of said cover spaced a substantial distance above said insulating material plate, said posts extending upward through said cover.

6. A storage battery cell electrode plate integrator, comprising a plate of insulating material having two spaced groups of parallel slots, each slot being adapted to receive and embrace closely a single electrode plate tab therein and hold it in definitely spaced relationship from an adjacent tab, the slots of one group being staggered with respect to the slots of the other group, the portion of said plate between said slot groups being coplanar with such slot groups and having a plurality of apertures therethrough constituting a splash baffle.

References Cited in the file of this patent

UNITED STATES PATENTS

| | | |
|---|---|---|
| 1,342,952 | Gardiner | June 8, 1920 |
| 1,380,061 | Hazlett | May 31, 1921 |
| 1,874,404 | Wood | Aug. 30, 1932 |
| 1,907,420 | Finn | May 2, 1933 |
| 2,287,802 | Hill | June 30, 1942 |
| 2,480,964 | Randall | Sept. 6, 1949 |
| 2,498,021 | Young | Feb. 21, 1950 |
| 2,618,673 | Shannon | Nov. 18, 1952 |

FOREIGN PATENTS

| | | |
|---|---|---|
| 478,659 | Canada | Nov. 20, 1951 |
| 126,236 | Australia | Dec. 24, 1947 |
| 190,765 | Great Britain | Jan. 2, 1923 |